(12) United States Patent
Lee

(10) Patent No.: US 7,452,627 B2
(45) Date of Patent: Nov. 18, 2008

(54) RECHARGEABLE BATTERY WITH JELLY ROLL TYPE ELECTRODE ASSEMBLY

(75) Inventor: Hyung Bok Lee, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 25 days.

(21) Appl. No.: 11/232,871

(22) Filed: Sep. 23, 2005

(65) Prior Publication Data

US 2006/0115729 A1 Jun. 1, 2006

(30) Foreign Application Priority Data

Sep. 24, 2004 (KR) ............. 10-2004-0077229

(51) Int. Cl.
*H01M 4/00* (2006.01)
*H01M 6/10* (2006.01)
*H01M 2/26* (2006.01)
*H01M 2/28* (2006.01)
*H01M 2/02* (2006.01)
*H01M 4/02* (2006.01)

(52) U.S. Cl. ............. 429/94; 429/161; 429/178; 429/179; 429/211

(58) Field of Classification Search ............. 429/94, 429/161, 178, 179, 211

See application file for complete search history.

(56) References Cited

U.S. PATENT DOCUMENTS

| 5,925,482 A * | 7/1999 | Yamashita | 429/130 |
| 2003/0054241 A1* | 3/2003 | Yamashita et al. | 429/181 |
| 2004/0126656 A1* | 7/2004 | Cho | 429/181 |

FOREIGN PATENT DOCUMENTS

JP 02000277093 A * 6/2000

OTHER PUBLICATIONS

"Tensile strength" from Wikipedia (http://en.wikipedia.org/wiki/Tensile_strength).*

* cited by examiner

*Primary Examiner*—Gregg Cantelmo
*Assistant Examiner*—Eugenia Wang
(74) *Attorney, Agent, or Firm*—H.C. Park & Associates, PLC

(57) ABSTRACT

A rechargeable battery that comprises a jelly roll type electrode assembly that comprises two electrodes with different polarities and separators for preventing an electrical short between the two electrodes is disclosed. The battery further comprises a case for storing the electrode assembly and electrode tabs that are made of different materials for connecting the two electrodes of the electrode assembly to an external circuit via the case, wherein the thicknesses of the electrode tabs are different. It is possible to reduce the thickness of a protruded part in an outer surface of the jelly roll due to the thinner electrode tabs and to reduce pressure on the activation materials near the protruded part.

8 Claims, 3 Drawing Sheets

RECHARGEABLE BATTERY WITH JELLY ROLL TYPE ELECTRODE ASSEMBLY

CROSS REFERENCE TO RELATED APPLICATION

This application claims priority to and the benefit of Korean Patent Application No. 2004-0077229, filed on Sep. 24, 2004 in the Korean Intellectual Property Office, the disclosure of which is incorporated herein in its entirety by reference.

BACKGROUND OF THE INVENTION

1. Field of the Invention

The present invention relates to a rechargeable battery that comprises a jelly roll type electrode assembly that comprises two electrodes and separators for insulating the two electrodes.

2. Description of the Related Art

Rechargeable batteries are currently being developed for use in a variety of applications because of their many advantages including rechargeability, compact size, and large power storage capacity. For example, a nickel-metal hydride (Ni-MH) battery, a lithium (Li) battery, and a lithium ion battery are now available for use.

In most rechargeable batteries, the bare cells are formed by housing an electrode assembly in a cell container and sealing the cell container with a cover. The container may be a pouch or a metallic can that is made of iron, aluminum, or an aluminum alloy. An electrolyte for a rechargeable battery may be a solid polymer, an electrolyte impregnated gel type polymer, or a liquid polymer in which the electrolyte ions are mixed with a solvent.

The sealed bare cell is coupled with safety devices such as a positive temperature coefficient (PTC) device, a thermal fuse, and a protective circuit module (PCM) and other accessories, and then packaged in a separate case. Gaps that are present between the bare cell and the accessories are filled or coated with a plastic resin to provide a packaged appearance.

It is critical to manufacture a rechargeable battery that is capable of storing an abundant amount of electricity and is also compact and lightweight. In order to improve electric power capacity, the contact area between an electrolyte and an activation material must be increased. Typically, the activation material is coated on a wide area of an electrode plate to increase the surface area of the activation material and the ratio of the activation material that contributes to producing electrical energy.

The electrode plate that includes the activation material coating is wound in a roll shape to reduce the size of the rechargeable battery. In some cases a plurality of electrode plates are stacked alternately according to their polarities. The electrode plates that have the same polarity are coupled, thereby providing a positive electrode and a negative electrode of a battery. Also, a separator is interposed between the electrodes of opposite polarity to prevent an internal short circuit.

FIG. 1 is a perspective view illustrating an electrode of a jelly roll type electrode assembly in a typical lithium rechargeable battery.

FIG. 2 is a cross-sectional view illustrating a jelly roll that is formed by winding a first electrode, a second electrode, and separators.

Referring to FIG. 1, the electrode plate may be a rectangular shape with uncoated portions on which the activation material 131 is not coated at both ends. A tab 17 is attached to an uncoated portion in order to draw out electric charges that are stored in the electrode plate and transfer them to external connection wires. Typically, the electrode plate is formed by coating slurries on current collectors. The current collector may be an aluminum foil or mesh or a copper foil, and the slurries are formed by mixing the activation material with a resin or the like.

In a conventional jelly roll type electrode assembly as shown in FIG. 2, the tabs 16 and 17 for coupling the electrode plate to external devices are bonded to the current collectors and then the stack is wound. Therefore, when the electrode plates are fully wound with the tabs 16 and 17, a protruded part A is formed on the outer surface of the jelly roll type electrode assembly as shown in FIG. 2.

The size of the can for containing the electrode assembly matches the electrode assembly in order to minimize the volume of the resulting battery. In addition, the tabs 16 and 17 are very thin. For example, they may be about 0.1 mm thick. Although the tabs are very thin, when they are wound with the electrode plates, the part of the electrode plates that protrude on the outer surface of the jelly roll type electrode assembly is not negligible. When the electrode assembly is inserted into the can, the protruded part may become snagged on the opening of the can. Furthermore, when the electrode assembly is inserted into and assembled with the can, the protruded part may create pressure on the activation materials in the overlapped portions of the jelly roll. This may interfere with the electrochemical reaction and reduce the electric capacity of the battery. This problem is exacerbated when the protruded part is thick. Particularly, when the negative electrode is located in the center of the jelly roll, this problem becomes more serious.

SUMMARY OF THE INVENTION

The present invention provides a rechargeable battery that has a jelly roll type electrode assembly with a protruded part formed on the external surface, by which the thickness of the protruded part can be reduced and pressure on the activation material caused by the protruded part can be reduced.

In contrast with a conventional jelly roll type electrode assembly where a nickel tab is typically positioned at the center of the electrode assembly and the protruding parts of the electrodes that overlap the nickel tab are large, the present invention prevents the activation material from being pressed due to the inserted tab because the nickel tab is made to be thin.

In addition, as conventional the electrode tabs are positioned at an inner part of the jelly roll, the size of the jelly roll is typically enlarged. Therefore, it is possible to reduce the volume of the entire jelly roll and prevent the electrode assembly from not easily being inserted into the can by locating the tab made of a material having a higher tensile strength in an inner side.

Additional features of the invention will be set forth in the description that follows, and in part will be apparent from the description, or may be learned by practice of the invention.

The present invention discloses a battery comprising a jelly roll type electrode assembly that has two electrodes with different polarities and separators for preventing an electrical short between the two electrodes. The battery further comprises a case for storing the electrode assembly and electrode tabs that are made of different materials and have different thicknesses. The electrode tabs connect the two electrodes of the electrode assembly to an external circuit via the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 3:
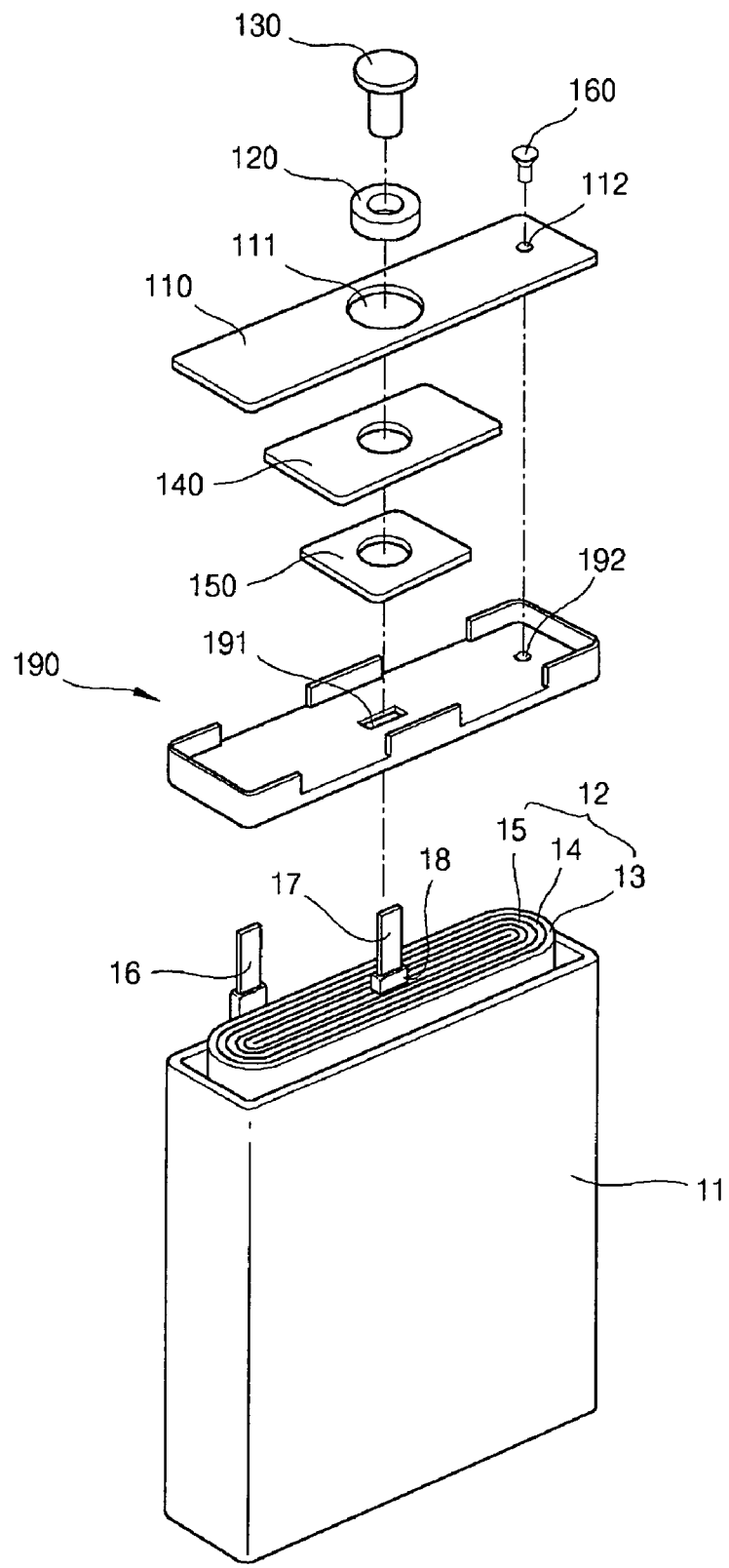
FIG. 3 is an exploded perspective view illustrating a bare cell in a lithium ion rechargeable battery according to an exemplary embodiment of the present invention.

FIG. 3 is an exploded perspective view that illustrates a lithium ion rechargeable battery according to an exemplary embodiment of the present invention.

Referring to FIG. 3, the bare cell of the lithium ion rechargeable battery includes a can 11, an electrode assembly 12 that is stored in the can 11, and a cap assembly that is combined with an open surface of the can 11 to seal the surface.

The electrode assembly 12 is formed by winding a stack comprising a positive electrode plate 13 which is a thin plate or a thin film, a negative electrode plate 15, and separators 14 that are interposed therebetween. The positive electrode plate 13 comprises a positive current collector comprising a highly conductive metallic thin film such as an aluminium foil or mesh. The positive electrode plate also comprises a positive electrode activation material layer comprising a lithium-based oxide coating on one surface or both surfaces of the positive current collector. A positive electrode tab 16 is coupled to an uncoated portion of the positive electrode plate 13 on which the positive electrode activation material layer is not provided.

Similarly, the negative electrode plate 15 comprises a negative current collector comprising a highly conductive metallic thin film such as a copper foil or mesh and a negative electrode activation material layer. The negative current collector comprises carbon based materials that are coated on one surface or both surfaces of the negative current collector. A negative electrode tab 17 is also coupled with an uncoated portion of the negative electrode plate 15 on which the negative electrode activation material layer is not provided.

The electrode tabs 16 and 17 are coupled with their respective electrode current collectors and may extend toward the cap assembly in a vertical direction along a winding axis of the jelly roll. The positive electrode tab 16 has one end coupled with the positive electrode plate 13 and another end welded to the lower surface of the cap plate 110. The negative electrode tab 17 has one end coupled with the negative electrode plate 15 and another end folded in a zigzag shape and welded to the lower end of the electrode terminal 130.

The polarities of the positive electrode plate 13 and the negative electrode plate 15 may be switched. Also, polarities of the positive electrode tab 16 and the negative electrode tab 17 may be switched. An insulation tape 18 is applied to boundaries where the positive electrode tab 16 and the negative electrode tab 17 are coupled with the electrode assembly 12 in order to prevent an electrical short between two electrode plates 13 and 15.

The separator 14 may comprise, but is not limited to polyethylene, polypropylene, or a copolymer of polyethylene and polypropylene. The separator 14 may be wider than the positive electrode plate 13 or the negative electrode plate 15 to prevent an electrical short between the electrodes.

In a pouch type lithium ion polymer battery, the electrolyte may be a solid polymer electrolyte that functions as a separator or a solid or gel type electrolyte that is absorbed in the separator. In contrast, in a can type lithium ion battery, a liquid electrolyte comprising ions may be injected into the electrode assembly in the can.

The can may have a rectangular parallelepiped shape or a cylindrical shape, and may comprise aluminum, an aluminium alloy, or other metals such as iron. After the electrode assembly 12 is inserted in the can, its open top surface is sealed with the cap assembly that has a cap plate 110. Although the can may itself serve as a terminal, the cap plate 110 of the cap assembly serves as the positive electrode terminal according to the present embodiment.

The cap assembly comprises a planar cap plate 110 that has a size and a shape that are similar to the top surface of the can. A terminal through-hole 111 for installing the electrode terminal may be provided at the center of the cap plate 110. A gasket 120 for insulating the electrode terminal 130 from the cap plate 110 is disposed around the electrode terminal 130 may be inserted through the terminal through-hole 111. An insulation plate 140 is disposed under the cap plate 110. A terminal plate 150 is also installed under the insulation plate 140.

The electrode terminal 130 is inserted into the terminal through-hole 111 with the gasket 120 shielding its circumference. The lower surface of the electrode terminal 130 is coupled with the terminal plate 150 with the insulation plate 140 interposed therebetween.

An insulation case 190 is provided on a top surface of the electrode assembly 12 to insulate the electrode assembly 12 from the cap assembly and, at the same time, to cover the opening of the electrode assembly 12. The insulation case 190 preferably comprises an insulating polymer resin such as polypropylene, for example. The insulation case 190 has a through-hole 191 for inserting the negative electrode tab 17. An electrolyte vent 192 may optionally be provided near an edge of the insulation case 190 or near the through-hole 191.

An electrolyte inlet 112 is provided on the cap plate 110. A stopper 160 is inserted into the electrolyte inlet 112 to seal it after the electrolyte is supplied. The stopper 160 may be a ball-shaped parent material that comprises a metal such as aluminium or an aluminium alloy. The stopper 160 may be formed on the electrolyte inlet 112 by mechanically pressing or forcibly inserting it into the electrolyte inlet 112.

Figure 4:
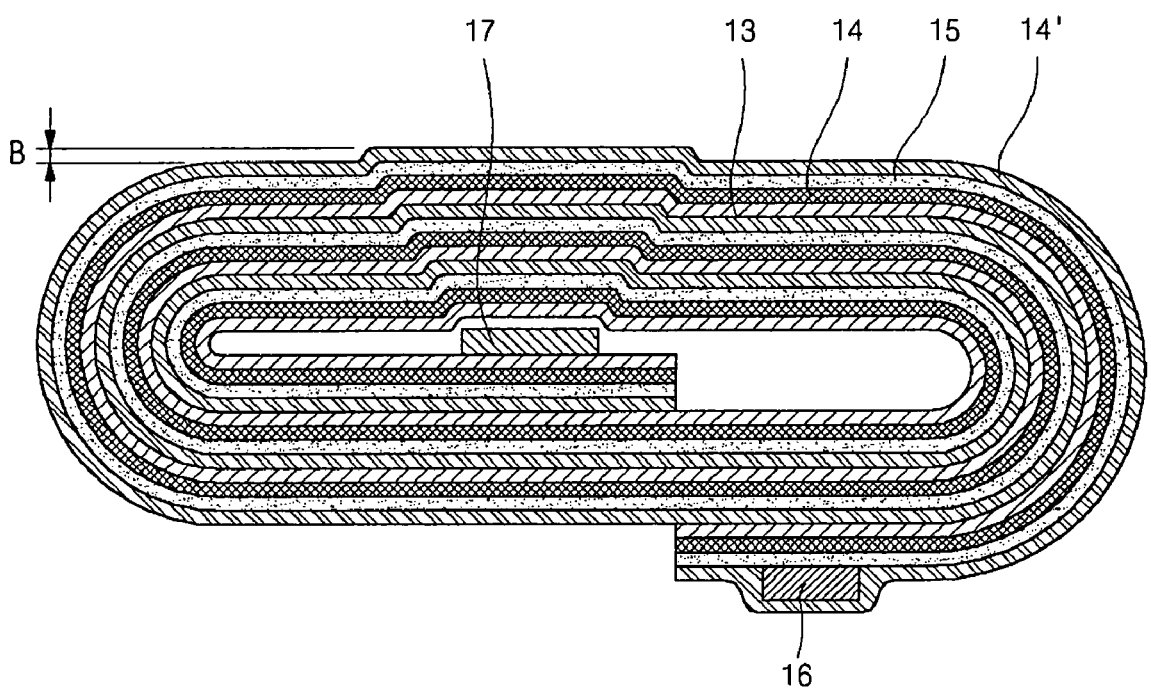
FIG. 4 is a cross-sectional view illustrating a jelly role type electrode assembly of a rechargeable battery according to an exemplary embodiment of the present invention.

FIG. 4 is a cross-sectional view that illustrates a jelly roll type electrode assembly of a rechargeable battery according to an exemplary embodiment of the present invention. The jolly roll type electrode assembly is formed by winding a positive electrode plate 15, a negative electrode plate 13, and separators 14 and 14'.

Figure 1:
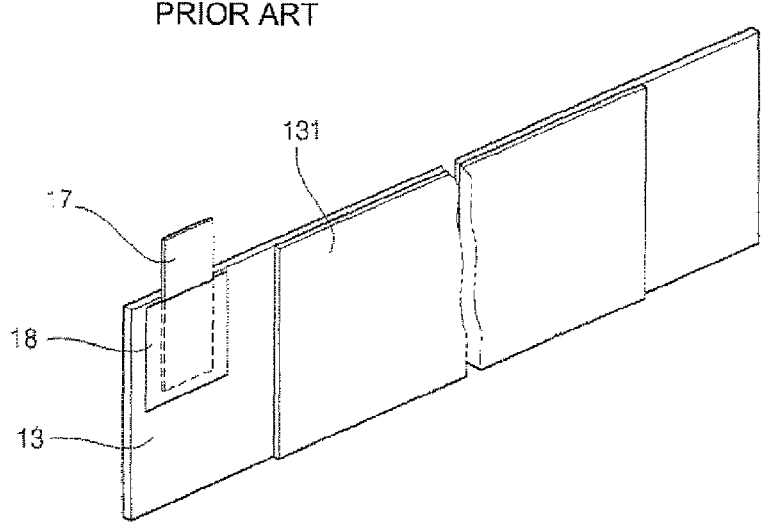
FIG. 1 is a perspective view illustrating a jelly roll type electrode assembly in a typical lithium rechargeable battery.
Figure 2:
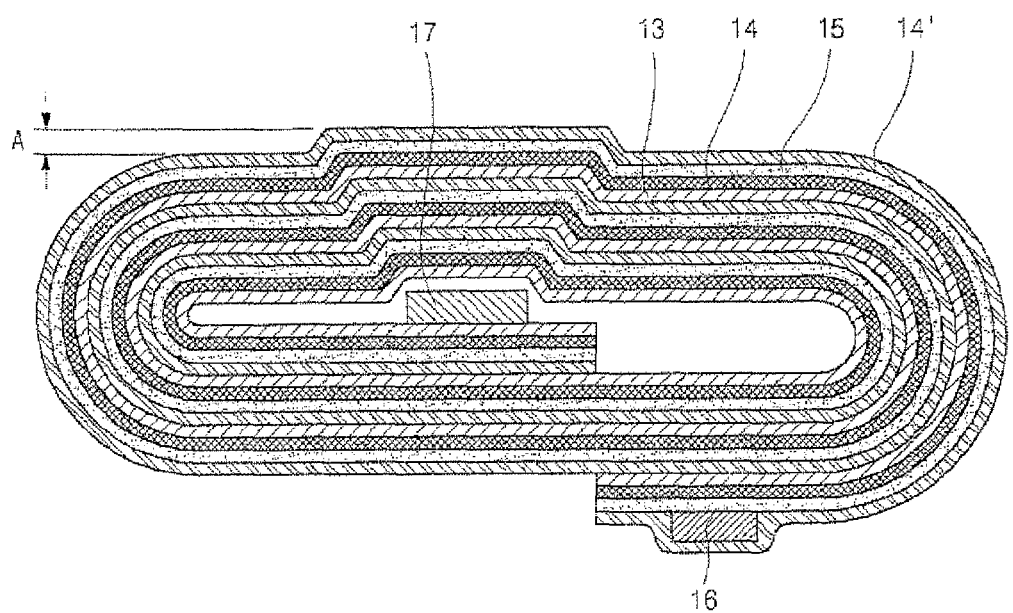
FIG. 2 is a cross-sectional view illustrating a jelly roll formed by winding a first electrode, a second electrode, and separators.

Referring to FIG. 4, it is evident that the thickness of the negative electrode tab 17 is reduced in comparison with the conventional jelly role shown in FIG. 2, and the thickness of the resulting jelly roll is also reduced accordingly. This reduction in thickness may reduce the pressure on the activation material near the protruded part.

The electrode tabs 16 and 17 may comprise aluminium when the current collector comprises aluminium, or it may comprise nickel when the current collector comprises copper. An electrode tab comprising aluminium provides a tensile strength of about 30 kg/mm², whereas an electrode tab comprising nickel or a nickel-iron alloy provides a tensile strength within a range of 50 kg/mm² to 70 kg/mm². Both electrode tabs may be about 100 µm, for example. Since the thicknesses of the electrode tabs are determined on the basis of one of the tabs having a lower tensile strength, assuming that the electrode tabs are welded to the electrode terminal or the safety device with a sufficient mechanical strength, a nickel negative electrode tab 17 coupled with the negative electrode plate has a surplus thickness. Therefore, the requirement of the tensile strength for the nickel negative electrode tab 17 that is coupled with the copper electrode can be satisfied even when its thickness is 50 µm.

It may be required that the electrode tabs have a uniform thickness. Ideally, it is recommend that the thickness of the nickel electrode tab is 50% of the thickness of the aluminium positive electrode tab 16 assuming that the tensile strength of the nickel negative electrode tab 17 is twice that of the aluminium electrode tab. In this case, the thickness B of the protruded part is relatively reduced when compared with the protruded part A shown in FIG. 2.

However, since the tab may be overly pressed while forming the electrode assembly and the thickness of the electrode tab may be very thin, such as about 50 µm or 100 µm, the thickness of the tab may vary by the manufacturing process. For this reason, it is preferable to provide safety margins of about 10% more or less, for example, for the thicknesses of the electrode tabs 16 and 17. This safety margin will allow the difference of the tensile strengths of both tabs having different thicknesses and compositional materials to be within a maximum allowable range of 20% of the expected tensile strength of an aluminium positive electrode tab 16 or a nickel negative electrode tab 17.

Although the above embodiments have been described in relation to the electrode tabs that have different tensile strengths and different thicknesses, the difference in compositional material properties between both electrode tabs may cause differences in other properties. Therefore, it is possible to reduce the thickness of the electrode assembly based on the differences of other properties. Particularly, it is possible to prevent the pressing of the activation material of the electrode assembly when the tab is made to be thin. Also, it is possible to more effectively prevent such a problem by using the thinner tab as the tab that is located in the center of the electrode assembly.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery comprising:
   an electrode assembly that comprises a positive electrode, a negative electrode, separators for preventing an electrical short between the two electrodes, and a protruded part;
   a can for storing the electrode assembly; and
   a first electrode tab and a second electrode tab that are made of different materials for connecting the two electrodes of the electrode assembly to an external circuit via the can,
   wherein a thickness in a first direction of the first electrode tab is greater than a thickness in the first direction of the second electrode tab,
   wherein the second electrode tab has a higher tensile strength than the first electrode tab, and
   wherein the protruded part protrudes from an outermost surface of the electrode assembly in the first direction at an area corresponding to the second electrode tab.

2. The rechargeable battery of claim 1,
   wherein a difference between the tensile strength of the second electrode tab and the tensile strength of the first electrode tab is less than 20% of the tensile strength of the first electrode tab.

3. The rechargeable battery of claim 1,
   wherein the thickness of the second electrode tab is 60% or less than the thickness of the first electrode tab.

4. The rechargeable battery of claim 3,
   wherein the thickness of the second electrode tab is 50% or less than the thickness of the first electrode tab.

5. The rechargeable battery of claim 1,
   wherein one of the first electrode tab or the second electrode tab comprises nickel and the other comprises aluminum.

6. The rechargeable battery of claim 5,
   wherein the second electrode tab comprises nickel and the first electrode tab comprises aluminum, and wherein the thickness of the second electrode tab is 60% or less than the thickness of the first electrode tab.

7. The rechargeable battery of claim 1,
   wherein the electrode assembly is a jelly roll electrode assembly and the second electrode tab is positioned at a center of the jelly roll electrode assembly.

8. The rechargeable battery of claim 1,
   wherein the can comprises a rectangular parallelpiped shape.

* * * * *